(12) United States Patent
Kobayashi

(10) Patent No.: US 10,205,904 B2
(45) Date of Patent: Feb. 12, 2019

(54) IMAGE SENSOR CAPABLE OF CORRECTING NOISE CAUSED BY DARK CHARGE OF A FLOATING DIFFUSION PORTION, CONTROL METHOD THEREFOR, AND IMAGE CAPTURING APPARATUS

(71) Applicant: CANON KABUSHIKI KAISHA, Tokyo (JP)

(72) Inventor: Hirokazu Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/459,821

(22) Filed: Mar. 15, 2017

(65) Prior Publication Data

US 2017/0272675 A1 Sep. 21, 2017

(30) Foreign Application Priority Data

Mar. 17, 2016 (JP) .................................. 2016-054462

(51) Int. Cl.
| | | |
|---|---|---|
| *H04N 5/361* | (2011.01) | |
| *H04N 5/369* | (2011.01) | |
| *H04N 5/3745* | (2011.01) | |
| *H04N 5/378* | (2011.01) | |

(52) U.S. Cl.
CPC ............. *H04N 5/378* (2013.01); *H04N 5/361* (2013.01); *H04N 5/3696* (2013.01); *H04N 5/37457* (2013.01)

(58) Field of Classification Search
CPC .... H04N 5/378; H04N 5/361; H04N 5/37457; H04N 5/3696
See application file for complete search history.

(56) References Cited

U.S. PATENT DOCUMENTS

| | | | | |
|---|---|---|---|---|
| 2010/0013969 A1* | 1/2010 | Ui | ....................... | H04N 5/35545 348/294 |
| 2013/0020463 A1* | 1/2013 | Lee | ......................... | H04N 5/357 250/206 |
| 2014/0368707 A1* | 12/2014 | Ikeda | ..................... | H04N 5/378 348/301 |
| 2015/0162925 A1* | 6/2015 | Lee | ..................... | H03M 1/1295 250/208.1 |
| 2016/0309100 A1* | 10/2016 | Abe | ........................ | H04N 5/363 |

FOREIGN PATENT DOCUMENTS

| | | |
|---|---|---|
| JP | 2000-078474 A | 3/2000 |
| JP | 2014-030148 A | 2/2014 |

* cited by examiner

*Primary Examiner* — Gevell V Selby
(74) *Attorney, Agent, or Firm* — Cowan, Liebowitz & Latman, P.C.

(57) ABSTRACT

An image sensor has a plurality of unit pixels each provided with a plurality of photoelectric conversion portions and a floating diffusion portion, and an analog-digital converter. The analog-digital converter is controlled to: convert a reset level of the floating diffusion portion by counting in a first or second direction to acquire a first noise signal, acquire a first optical signal by counting in the first direction an analog signal of a first photo charge accumulated in a first photoelectric conversion portion, acquire a second noise signal by counting in the second direction a potential that the floating diffusion portion has after the first optical signal is acquired, and acquire a second optical signal by counting in the first direction an analog signal of a second photo charge accumulated in a second photoelectric conversion portion.

14 Claims, 10 Drawing Sheets

IMAGE SENSOR CAPABLE OF CORRECTING NOISE CAUSED BY DARK CHARGE OF A FLOATING DIFFUSION PORTION, CONTROL METHOD THEREFOR, AND IMAGE CAPTURING APPARATUS

BACKGROUND OF THE INVENTION

Field of the Invention

The present invention relates to an image sensor, a control method therefor, and an image capturing apparatus, and more particularly to an image sensor that reads out the signals of a plurality of photodiodes (PD) via a shared readout circuit, a drive method therefor, and an image capturing apparatus.

Description of the Related Art

In the field of image sensors, various technologies have been proposed to improve the light receiving efficiency of photoelectric conversion elements such as photodiodes (PDs) while reducing the size of individual pixels, in response to calls for higher resolution and higher sensitivity. With CMOS image sensors, instead of a configuration in which one readout circuit is provided for every one pixel, a configuration is now often employed in which one readout circuit is shared by a plurality of pixels and that one readout circuit is used sequentially (see Japanese Patent Laid-Open No. 2000-078474). A readout circuit as referred to here includes, for example, constituent elements such as a floating diffusion (FD) portion that temporarily accumulates electric charges transferred from each pixel and an amplification transistor whose gate receives input of the potential of the FD portion and that operates as a source follower circuit with a predetermined load current. By sharing one readout circuit between N pixels, the area required for such constituent elements can be reduced to 1/N and the saved area can be assigned to the PDs, thus enabling light receiving efficiency to be improved.

In recent years, marked progress has also been made toward higher functionality, and image sensors have also been proposed in which a plurality of PDs are provided in one pixel, in order to acquire information that is used in autofocus (AF) employing an on-imaging plane phase detection method. By constituting one pixel corresponding to one microlens with a PD divided horizontally into two, light that has passed through different pupil regions of the imaging optical system can be received by each PD. A shared readout circuit configuration is favorable, even when thus reading out the signals of twice as many PDs as there are pixels of a captured image.

Japanese Patent Laid-Open No. 2014-030148 discloses an image sensor that sequentially reads out electric charges accumulated in two photodiodes (PD) 1 and 2 that are used for phase difference detection to a shared readout circuit as an optical signal S1 and an optical signal S2. Here, the optical signal S1 corresponds to the signal of the PD 1 and the optical signal S2 corresponds to the sum of the signals of the PD 1 and the PD 2. That is, the optical signal S2 is an image signal for image capture that corresponds to light that has passed through all of the pupil regions of the imaging optical system. Therefore, it is possible to generate a captured image easily as required using the optical signal S2, without additional circuitry, while maintaining a pixel configuration that enables phase difference detection. Also, although an increase in random noise is conceivable in the case of generating a captured image by independently reading out the signal charges of the PD 1 and the PD 2 and combining these signal charges, such concerns do not arise.

However, the optical signal S2 is read out following a reset level readout period and the readout period of the optical signal S1, after resetting the FD portion. Therefore, there is a large time difference between the readout period of the optical signal S2 and the reset level readout period in which a signal to be used in correlated double sampling (CDS) is obtained, resulting in a decrease in temporal correlation. Also, since the FD portion does not have a deep buried structure unlike the PDs, a large amount of dark charge is generated in proportion to the time period that has elapsed from reset release. White dots appear on the captured image when there is variation in the generated amount of dark charge between FD portions.

SUMMARY OF THE INVENTION

The present invention has been made in consideration of the above situation, and appropriately corrects noise caused by dark charge of a floating diffusion portion in an image sensor that reads out the signals of a plurality of photoelectric conversion elements via a shared readout circuit.

According to the present invention, provided is an image sensor comprising: a pixel portion in which a plurality of unit pixels each provided with a plurality of photoelectric conversion portions and a floating diffusion portion shared by the plurality of photoelectric conversion portions are arrayed in matrix form; an analog-digital converter that compares an analog signal with a reference signal that changes over time at a predetermined gradient, and converts the analog signal to a digital signal by counting, in a first direction or a second direction that differs from the first direction, from a start of the comparison until a transition point of a result of the comparison; and a control circuit that controls the analog-digital converter; wherein the control circuit controls the analog-digital converter in a first mode to: convert a reset level of the floating diffusion portion by counting in the first direction or the second direction to acquire a first noise signal, acquire a first optical signal by counting, in the first direction, an analog signal obtained by transferring a first photo charge accumulated in one or more photoelectric conversion portions including at least a first photoelectric conversion portion, among the plurality of photoelectric conversion portions, to the floating diffusion portion, acquire a second noise signal by counting, in the second direction, a potential that the floating diffusion portion has after the first optical signal is acquired, and acquire a second optical signal by counting, in the first direction, an analog signal obtained by transferring a second photo charge accumulated in at least a second photoelectric conversion portion not included in the one or more photoelectric conversion portions, among the plurality of photoelectric conversion portions, to the floating diffusion portion.

Further, according to the present invention, provided is an image capturing apparatus in which an image sensor is mounted, wherein the image sensor comprising: a pixel portion in which a plurality of unit pixels each provided with a plurality of photoelectric conversion portions and a floating diffusion portion shared by the plurality of photoelectric conversion portions are arrayed in matrix form; an analog-digital converter that compares an analog signal with a reference signal that changes over time at a predetermined gradient, and converts the analog signal to a digital signal by counting, in a first direction or a second direction that differs from the first direction, from a start of the comparison until a transition point of a result of the comparison; and a control circuit that controls the analog-digital converter; wherein the control circuit controls the analog-digital converter in a first mode to: convert a reset level of the floating diffusion portion by counting in the first direction or the second direction to acquire a first noise signal, acquire a first optical signal by counting, in the first direction, an analog signal obtained by transferring a first photo charge accumulated in one or more photoelectric conversion portions including at least a first photoelectric conversion portion, among the plurality of photoelectric conversion portions, to the floating diffusion portion, acquire a second noise signal by counting, in the second direction, a potential that the floating diffusion portion has after the first optical signal is acquired, and acquire a second optical signal by counting, in the first direction, an analog signal obtained by transferring a second photo charge accumulated in at least a second photoelectric conversion portion not included in the one or more photoelectric conversion portions, among the plurality of photoelectric conversion portions, to the floating diffusion portion.

Furthermore, according to the present invention, provided is an image sensor comprising: a pixel portion in which a plurality of unit pixels each provided with a plurality of photoelectric conversion portions and a floating diffusion portion shared by the plurality of photoelectric conversion portions are arrayed in matrix form; and a control circuit that controls the pixel portion; wherein the control circuit performs control to: reset the floating diffusion portion, and acquire a first noise signal based on a potential that the floating diffusion portion has after the resetting, transfer a first photo charge accumulated in one or more photoelectric conversion portions including at least a first photoelectric conversion portion, among the plurality of photoelectric conversion portions, to the floating diffusion portion, and acquire a first optical signal based on the potential of the floating diffusion portion to which the first photo charge was transferred, acquire a second noise signal based on the potential that the floating diffusion portion has after the first optical signal is acquired, and transfer a second photo charge accumulated in at least a second photoelectric conversion portion not included in the one or more photoelectric conversion portions, among the plurality of photoelectric conversion portions, to the floating diffusion portion, and acquire a second optical signal based on the potential of the floating diffusion portion to which the second photo charge was transferred.

Further, according to the present invention, provided is a control method of an image sensor having a pixel portion in which a plurality of unit pixels each provided with a plurality of photoelectric conversion portions and a floating diffusion portion shared by the plurality of photoelectric conversion portions are arrayed in matrix form, and an analog-digital converter that compares an analog signal with a reference signal that changes over time at a predetermined gradient, and converts the analog signal to a digital signal by counting, in a first direction or a second direction that differs from the first direction, from a start of the comparison until a transition point of a result of the comparison, the analog-digital converter: converting a reset level of the floating diffusion portion by counting in the first direction or the second direction to acquire a first noise signal, acquiring a first optical signal by counting, in the first direction, an analog signal obtained by transferring a first photo charge accumulated in one or more photoelectric conversion portions including at least a first photoelectric conversion portion, among the plurality of photoelectric conversion portions, to the floating diffusion portion, acquiring a second noise signal by counting, in the second direction, a potential that the floating diffusion portion has after the first optical signal is acquired, and acquiring a second optical signal by counting, in the first direction, an analog signal obtained by transferring a second photo charge accumulated in at least a second photoelectric conversion portion not included in the one or more photoelectric conversion portions, among the plurality of photoelectric conversion portions, to the floating diffusion portion.

Further, according to the present invention, provided is a control method of an image sensor having a pixel portion in which a plurality of unit pixels each provided with a plurality of photoelectric conversion portions and a floating diffusion portion shared by the plurality of photoelectric conversion portions are arrayed in matrix form, the method comprising: resetting the floating diffusion portion, and acquiring a first noise signal based on a potential that the floating diffusion portion has after the resetting, transferring a first photo charge accumulated in one or more photoelectric conversion portions including at least a first photoelectric conversion portion, among the plurality of photoelectric conversion portions, to the floating diffusion portion, and acquiring a first optical signal based on the potential of the floating diffusion portion to which the first photo charge was transferred, acquiring a second noise signal based on the potential that the floating diffusion portion has after the first optical signal is acquired, and transferring a second photo charge accumulated in at least a second photoelectric conversion portion not included in the one or more photoelectric conversion portions, among the plurality of photoelectric conversion portions, to the floating diffusion portion, and acquiring a second optical signal based on the potential of the floating diffusion portion to which the second photo charge was transferred.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
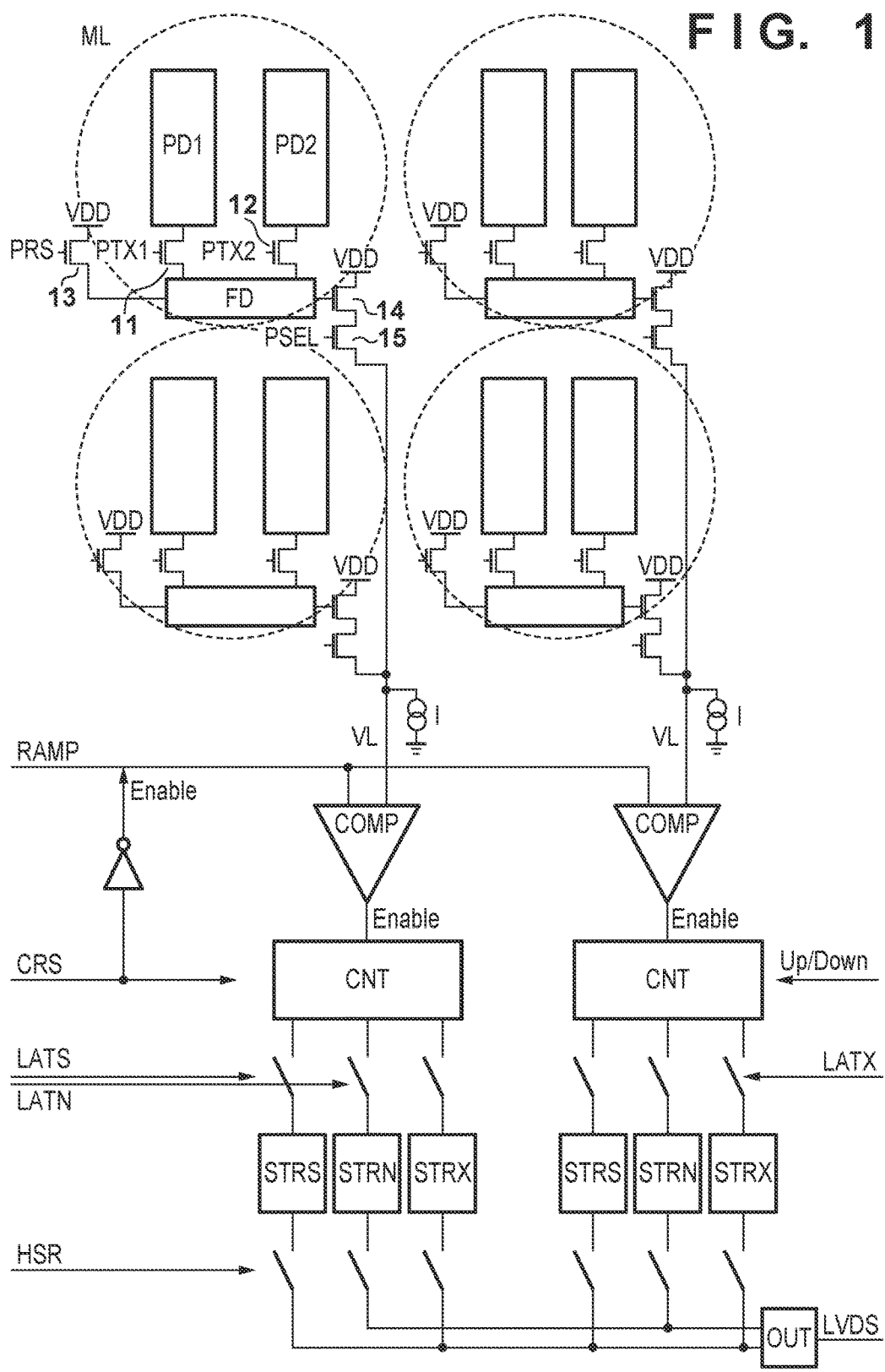
FIG. 1 is a block diagram showing an exemplary configuration of an image sensor according to a first embodiment of the present invention.

First, the configuration of an image sensor according to a first embodiment of the present invention will be described. FIG. 1 is a block diagram showing an exemplary configuration of the image sensor according to the first embodiment.

In FIG. 1, ML represents the circumference of a microlens. Two photodiodes PD 1 and PD 2 corresponding to this microlens are photoelectric conversion portions configured for phase difference detection, and one unit pixel of an imaging signal is constituted by the sum of electric charges (photo charges) that are obtained by these photodiodes. FIG. 1 shows four unit pixels arrayed in matrix form in two rows and two columns, among the unit pixels constituting the pixel portion of the image sensor, although in actuality many image sensors now have tens of millions of pixels. Also, control signals are applied horizontally as shared signals, and signals are read out in units of rows. Accordingly, constituent elements such as comparators and counters which will be discussed later are arrayed for the number of columns, and the pixel signals for one row are input by vertically shifting the row to be read out. Such shifting of the readout row is generally realized by a scanning circuit called a vertical shift register or the like which is not shown.

The photo charges accumulated in the two photodiodes PD 1 and PD 2 are respectively transferred to a shared floating diffusion portion (FD) by transfer transistors 11 and 12, when transfer signals TX1 and TX2 are high. Also, an amplification transistor 14 to whose gate the FD is connected constitutes a source follower circuit together with a current source I connected to a vertical signal line VL, via a selection transistor 15, and is able to transmit the potential of the FD to the vertical signal line VL, when a selection signal PSEL is high. On the other hand, when a reset signal PRS is high, the FD is reset to a power supply potential VDD via a reset transistor 13.

A comparator COMP compares the potential (hereinafter, called "VL potential") of the vertical signal line VL, which is an analog signal, with a RAMP signal (reference signal) whose potential changes at a constant gradient over time. The comparator COMP outputs high when RAMP signal >VL potential and outputs low when RAMP signal ≤VL potential, according to the magnitude relation thereof. A counter CNT operates with the output of the comparator COMP as an enable signal. The counter CNT can be initialized using a counter reset signal CRS. Accordingly, if counter reset is released simultaneously with generation of the RAMP signal after having reset the counter CNT when the counter enable signal is high, for example, counting is started from that time (comparison start). Because the enable signal changes to low when the RAMP signal exceeds the VL potential as a result of the comparison (transition point), counting stops. That is, because the value of the counter CNT that has stopped counting is proportional to the VL potential, analog-digital conversion (AD conversion) to a digital signal can be performed. Note that the inverted signal of this counter reset signal CRS is also used as the enable signal of the RAMP signal. Also, this counter CNT is able to switch between up-counting and down-counting as required using an up/down count control signal.

STRS, STRN and STRX are latch circuits for each temporarily storing the value of the stopped counter CNT. STRS is for optical signals, STRN is for reset levels, and STRX is for flaw or noise signals. Transfer to the latch circuits STRS, STRN and STRX is respectively controlled using control signals LATS, LAIN and LATX. The comparator COMP, the counter CNT, and the latch circuits SIRS, STRN and STRX are each constituted for every column.

The latch circuits SIRS, STRN and STRX are selected in column sequence using a horizontal scanning signal HSR. S-N-X imaging signals or signals for phase difference detection based on S-N are thereby output in a high-speed serial signal format such as low voltage differential signal (LVDS) format.

In the first embodiment, a specific drive method for an image sensor having the configuration shown in FIG. 1 will be described, and a method for detection and correction of white dots caused by the FD, which is an object of the present invention, will be described in detail.

Figure 2:
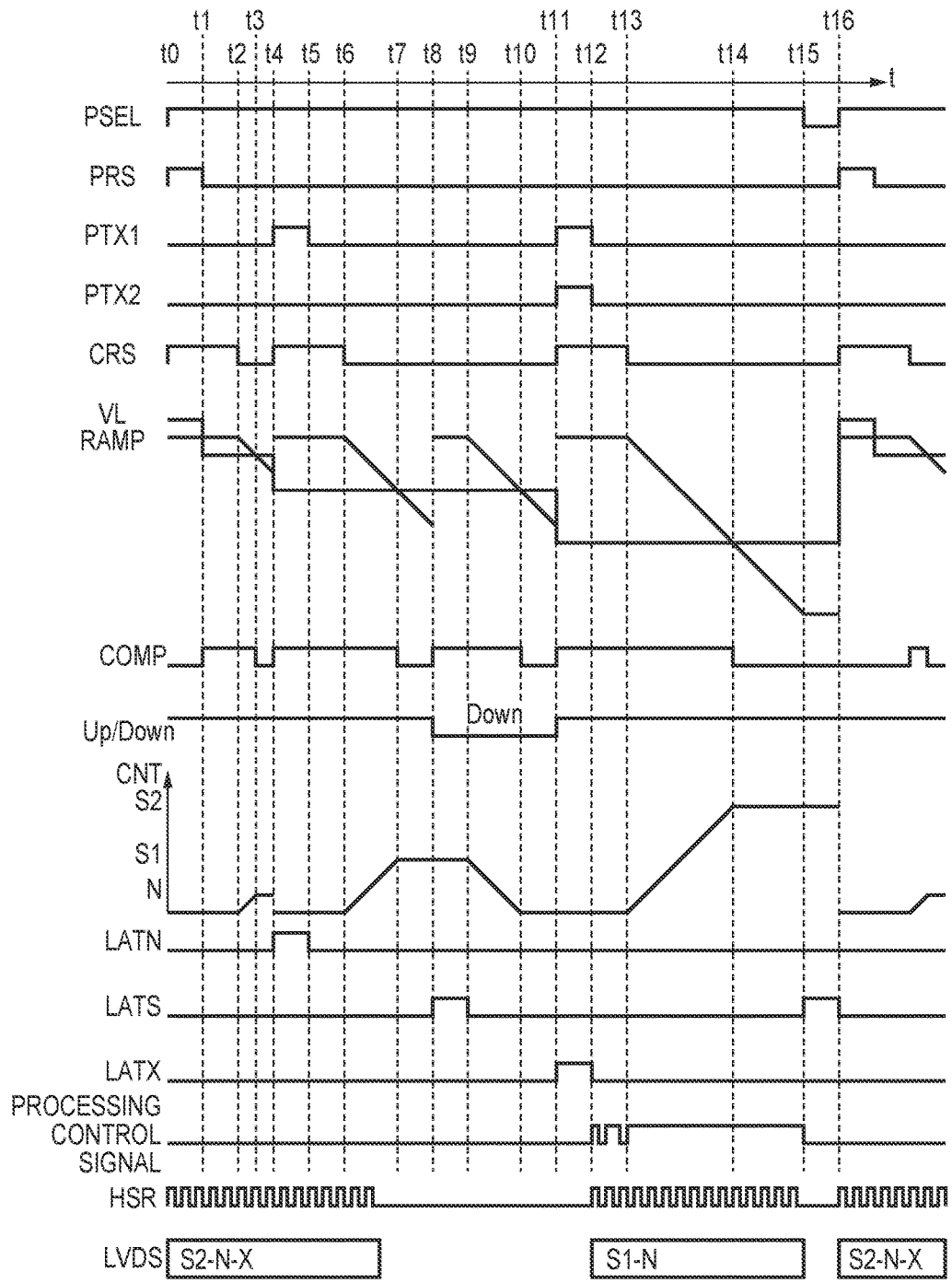
FIG. 2 is a timing chart showing a drive method for the image sensor according to the first embodiment.

FIG. 2 is a timing chart showing an example of a drive method for the image sensor shown in FIG. 1. In FIG. 2, the horizontal axis represents time in which time t0 is the start point of one horizontal synchronization period, and the period until time t16 is the cycle of one horizontal synchronization period.

First, at time t0, the selection signal PSEL to the selection transistor 15 and the reset signal PRS to the reset transistor 13 rise, and selection of a row and resetting of the FD are started. The reset signal PRS is lowered at time t1, and resetting of the FD is released. Because the potential of the vertical signal line VL falls when resetting of the FD is released, the relation RAMP signal >VL potential is established depending on the setting of the origin of the RAMP signal, for example, and the output (hereinafter, called "COMP output") from the comparator COMP becomes high from time t1.

At time t2, the counter reset signal CRS falls, resulting in the RAMP signal changing to an enabled state and the counter CNT starting to count. At time t3, the relation RAMP signal ≤VL potential is established, and the COMP output is inverted to low. Because the count enabled state of the counter CNT thereby ends, the count value N at the time of inversion is stored. This is equivalent to AD conversion of the first noise signal that is based on the reset level (potential after reset) of the FD having been performed. Note that the control signal LATN is set to high from time t4 until time t5 to transfer the count value N to the latch circuit STRN in preparation for AD conversion of an optical signal S1.

At time t4, the counter reset signal CRS is raised and resetting of the counter CNT is started again. Also, a transfer signal PTX1 of the transfer transistor 11 is raised in parallel, in order to transfer the signal charge (photo charge) of the PD 1 to the FD. At time t5, the transmission signal PTX1 is lowered to end transfer of the signal charge of the PD 1. Next, at time t6, AD conversion of the first optical signal S1 is started, by lowering the counter reset signal CRS. At time t7, the relation RAMP signal≤ VL potential is established, ending AD conversion of the first optical signal S1 due to the COMP output being inverted. Note that the control signal LATS is set to high from time t8 until time t9 to transfer the count value S1 to the latch circuit SIRS in preparation for AD conversion of an optical signal S2.

Next, at time t8, the COMP output returns to high again when the RAMP signal is reset using a RAMP reset control line which is not shown. Furthermore, the up/down count control signal is lowered without resetting the counter CNT by maintaining the counter reset signal CRS at low. Next, resetting of the RAMP signal is released at time t9, and down-counting is performed. Because counting down is thereby performed, with S1 as the initial value, until the RAMP signal becomes less than or equal to the optical signal S1, the COMP output is inverted at time t10 and the count value is returned to a balance of 0 if no white dots is caused by the FD. On the other hand, because the down-counting period is extended if white dots are caused by the FD, the count value will fall below 0 and a minus count value X (second noise signal) will be obtained. Note that the control signal LATX is set to high from time t11 until time t12 to transfer the count value X to the latch circuit STRX.

At time t11, the RAMP signal is reset when the up/down count control signal is returned to high, and the counter reset signal CRS is raised to start resetting of the counter CNT. Also, the transfer signals PTX1 and PTX2 of the transfer transistors 11 and 12 are raised to start transfer of the signal charges (photo charges) from the PD 1 and the PD 2 to the shared FD. By performing transfer without resetting the shared FD to which most of the signal charge of the PD 1 has already been transferred, the signal charges of the PD 1 and the PD 2 are added, thus enabling the resultant signal to be treated as the second optical signal S2 for captured image generation. At time t12, the transfer signals PTX1 and PTX2 are lowered to end the transfer of signal charges.

Next, at time t13, AD conversion of the second optical signal S2 is started when the counter reset signal CRS is lowered to release resetting of the counter CNT. At time t14, the relation RAMP signal ≤VL potential is established, and the COMP output is inverted to low. Because the count enabled state of the counter CNT thereby ends, the count value S2 at the time of inversion is obtained. Note that the control signal LATS is set to high from time t15 until time t16 to transfer the count value S2 to the latch circuit SIRS in preparation for AD conversion of the next selection row. Also, at this time, the selection signal PSEL is set to low in preparation for the next row selection to be performed at time t16.

On the other hand, the horizontal scanning signal HSR is generated between time t12 and time t15, and the latch circuit SIRS and the latch circuit STRN are selected in column sequence. The difference signal thereof being output in a format such as LVDS by an output unit OUT enables a phase difference detection signal S1-N to be obtained.

By generating the horizontal scanning signal HSR again from time t16 and selecting the latch circuit SIRS, the latch circuit STRN and the latch circuit STRX in column sequence, a difference signal S2-N-X can be obtained as a noise-corrected captured image in the output unit OUT. Note that the horizontal scanning signal HSR is also generated from times t0 until t7 and the difference signal S2-N-X is output, although this is the captured image of the previous row.

Because an image that corresponds to the signal charge of the PD 2 is also obtained when the difference image between the captured image S2-N-X thus obtained and the phase difference detection signal S1-N previously obtained is calculated, phase difference detection required in AF can be performed using these images.

Note that if the PD 1 and the PD 2 roughly divide the pixel into two, the signal charge that is generated by the PD 1 will be roughly half of the signal charges of the PD 1 and the PD 2. Accordingly, in the present embodiment, the AD conversion period of the optical signal S1 set from time t5 until time t8 is configured to be half of the length of the AD conversion period (from time t12 until time t15) of the optical signal S2. The remaining half of the period (from time t8 until time t11) is then utilized by being assigned to detection of the noise level X. Detection of the noise level X is thus made possible, without changing the length of one horizontal synchronization period compared with conventional technologies, by utilizing the fact that the possibility of the optical signal S1 exceeding half of the optical signal S2 is low.

Second Embodiment

Figure 3A:
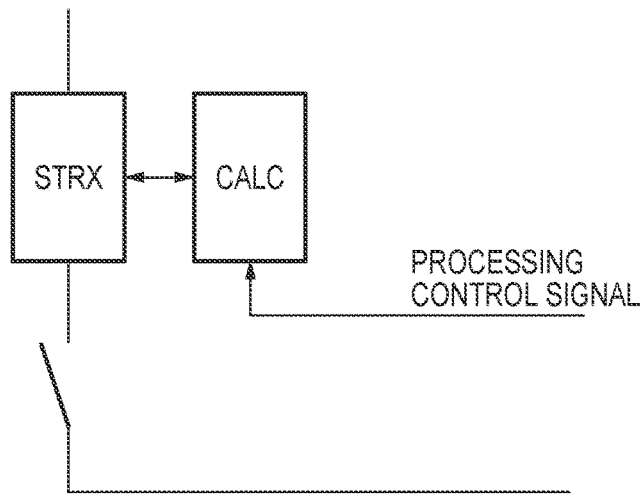
FIGS. 3A and 3B are block diagrams showing exemplary configurations of a processing circuit according to second and third embodiments.

Next, a second embodiment of the present invention will be described. In the second embodiment, a configuration is adopted that controls whether or not to deduct a value obtained by processing the detected noise level X from S2-N, according to the value of the noise level X. FIG. 3A is an example showing a configuration for performing this control, and a calculator CALC is provided in correspondence with each latch circuit STRX. The calculator CALC reads out the noise level X latched to the latch circuit STRX and selectively performs processing by threshold or processing by coefficient which will be discussed later, before once more replacing the calculated data back into the latch circuit STRX as the noise level X. The calculator CALC may be provided with only required processing circuitry, or may be configured so as to operate only required processing circuitry using processing control signals.

Since the image sensor of the second embodiment apart from the above is similar to the configuration shown in FIG. 1, description is omitted here. Because the signal readout timing of the image sensor is also similar to that described in the first embodiment with reference to FIG. 2, description is omitted.

Figure 4:
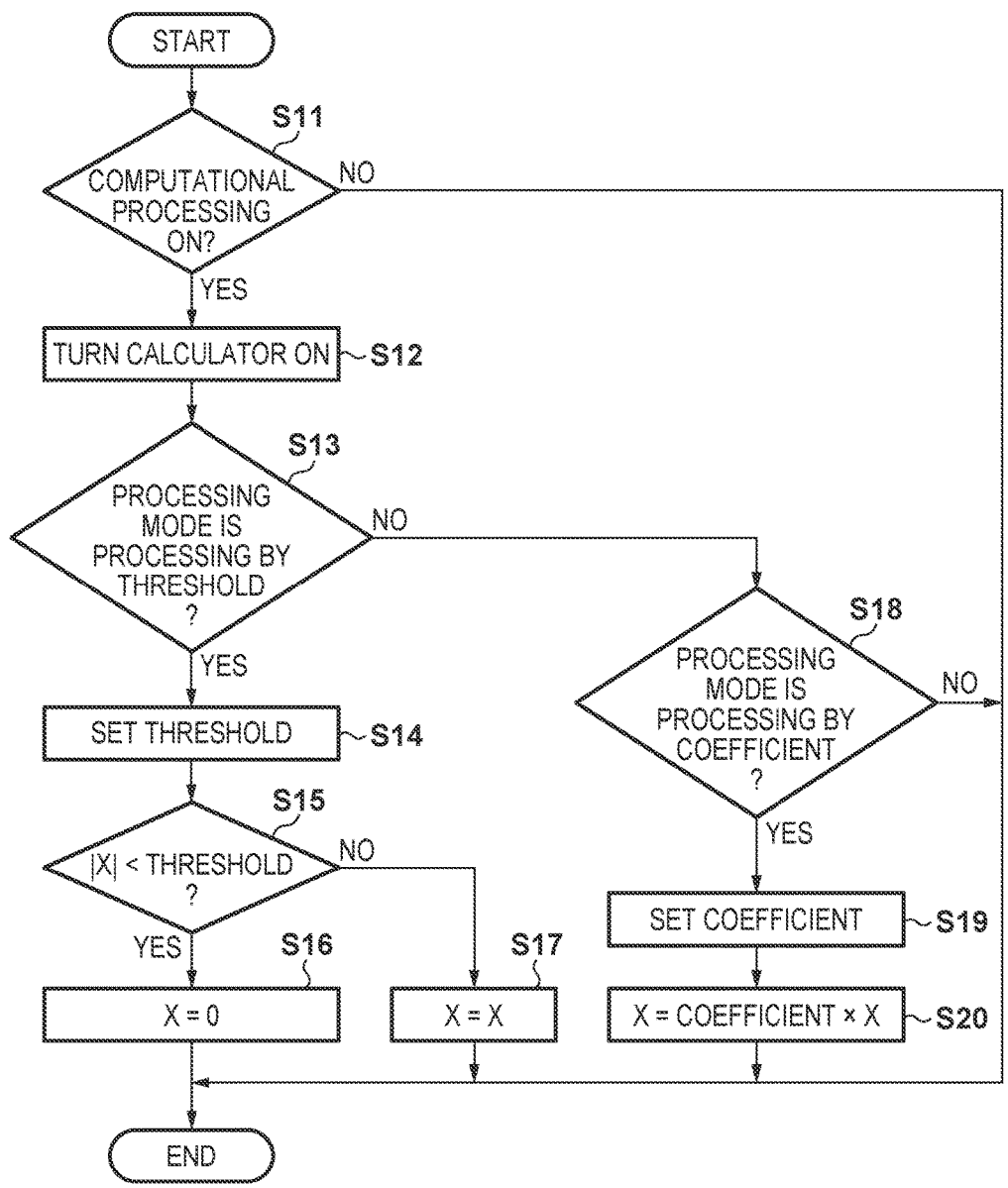
FIG. 4 is a flowchart representing noise level correction processing according to the second embodiment.

Next, an example of processing for correcting the detected noise level X in the second embodiment will be described. FIG. 4 is a flowchart showing processing for correcting the detected noise level X. Note that the processing shown in FIG. 4 is performed between times t12 and t15, after the noise level X has been transferred to the latch circuit STRX at t12 of FIG. 2.

When processing is started, it is determined, in step S11, whether the processing control signal indicates to implement computational processing which will be described below. In the case of not implementing such processing, the procedure is directly ended, and in the case of implementing such processing, the procedure advances to step S12 and the calculator CALC is turned on.

Next, in step S13, it is determined whether the processing mode that is indicated by the processing control signal is processing by threshold. In the case of processing by threshold, the threshold setting is loaded in step S14, and, in step S15, the absolute value of the count value X is compared with a threshold set in advance. If the absolute value of the count value X is lower than the threshold (YES at step S15), X is replaced with 0 (S16), and if the absolute value of the count value X is greater than or equal to the threshold (NO at step S15), replacement processing is not performed (S17). The above processing by threshold enables white dots of a very low level to be disregarded, and white dots of a high level that greatly affect image quality to be corrected.

On the other hand, if it is determined in step S13 that the processing mode is not processing by threshold, the procedure advances to step S18 and it is determined whether the processing mode is processing by coefficient. If the processing mode is also not processing by coefficient, the procedure is directly ended, because the processing mode is unknown.

In the case of processing by coefficient, a coefficient is set in step S19, and, in S20, the noise level X is replaced with a value obtained by multiplying X by the coefficient. Here, the fact that white dots are caused by the FD are proportional to the time period that has elapsed from reset release is taken into consideration. This enables accurate noise correction to be performed, with the ratio of the detection time period of the noise level X (=AD conversion period of S1)=t11−t8 and time from the end of AD conversion of the reset level N to the start of AD conversion of S2=t13−t4 as the coefficient. That is, the coefficient is given as:

$$(t13-t4)/(t11-t8) \tag{1}$$

Alternatively, the fact that the start of the AD conversion period of the optical signal S2 is delayed by the AD conversion period of the optical signal S1, after the end of AD conversion of the reset level N, is taken into consideration. This enables noise correction equivalent to the optical signal S1 to be performed, with the ratio of t11−t8 and the time period from the end of the AD conversion period of the reset level N until the end of the AD conversion period of the noise level X=t11−t4 as the coefficient. That is, the coefficient is given as:

$$(t11-t4)/(t11-t8) \tag{2}$$

White dots can thereby be more appropriately corrected from a captured image, by multiplying the detected noise level X by the coefficient, using either equation (1) or equation (2).

The processing for replacing the noise level X is ended when the processing of any of step S16, step S17 and step S20 ends.

Third Embodiment

Figure 3B:
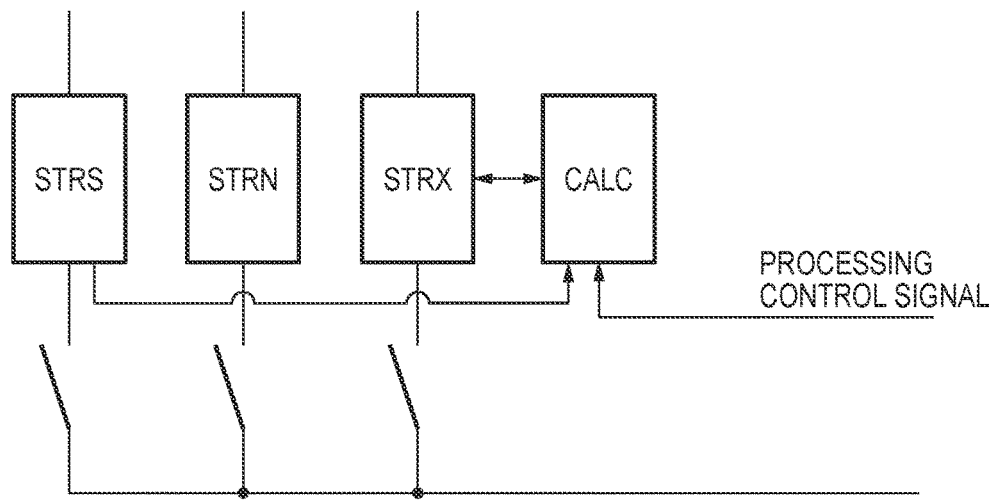

Next, a third embodiment of the present invention will be described. In the third embodiment, a configuration is adopted that controls whether or not to deduct a value obtained by processing the detected noise level X from S2-N, according to the value of the optical signal S1. FIG. 3B is an example showing a configuration for performing this control, and in addition to a calculator CALC being provided in correspondence with each latch circuit STRX, the calculator CALC is connected to the latch circuit STRS, in order to refer to the optical signal S1. The calculator CALC reads out the noise level X latched to the latch circuit STRX and performs processing by referring to S1 which will be discussed later, before once more writing the calculated data back into the latch circuit STRX as the noise level X. Note that the calculator CALC may be provided with only required processing circuitry, or may be configured so as to operate only required processing circuitry using processing control signals.

Note that since the image sensor of the third embodiment apart from the above is similar to the configuration shown in FIG. 1, description is omitted here. Because the signal readout timing of the image sensor is also similar to that described in the first embodiment with reference to FIG. 2, description is omitted.

Figure 5:
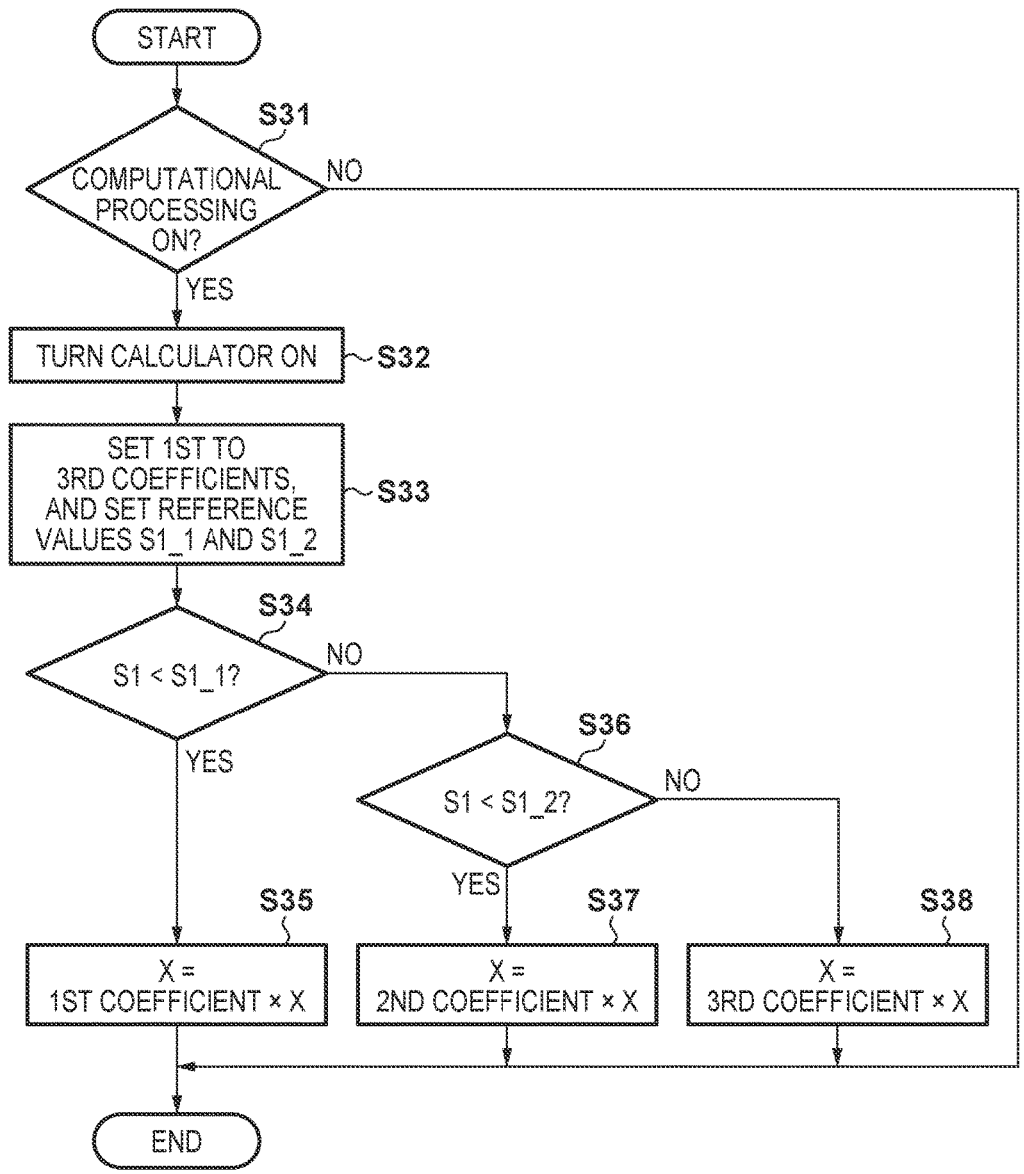
FIG. 5 is a flowchart representing noise correction processing of the image sensor according to the third embodiment.

Next, an example of processing for correcting the detected noise level X in the third embodiment will be described. FIG. 5 is a flowchart showing processing for correcting the noise level X. Note that the processing shown in FIG. 5 is performed between times t12 and t15, after the noise level X has been transferred to the latch circuit STRX at t12 of FIG. 2.

When processing is started, it is determined, in step S31, whether the processing control signal indicates to implement computational processing which will be described below. In the case of not implementing such processing, the procedure is directly ended, and in the case of implementing such processing, the procedure advances to step S32 and the calculator CALC is turned on. Processing by referring to S1 is performed in the third embodiment.

In step S33, loading of three coefficients, namely, first to third coefficients, and reference values S1_1 and S1_2 for setting these coefficients according to the level of the optical signal S1 is performed. In step S34, the optical signal S1 that is stored in the latch circuit SIRS is loaded and compared with the reference value S1_1. If the optical signal S1 is smaller than the reference value S1_1, the noise level X is multiplied by the first coefficient and the result is replaced back (S35). The optical signal S1, if greater than or equal to the reference value S1_1 (NO at step S34), is further compared with the reference value S1_2 (S36), and if smaller, the noise level X is multiplied by the second coefficient and the result is replaced back (S37). If the optical signal S1 is greater than or equal to the reference value S1_2, the noise level X is multiplied by the third coefficient and the result is replaced back (S38). The processing for correcting the noise level X is ended when the processing of any of step S35, step S37 and step S38 ends.

Because the noise correction that is performed in the present invention is subtraction correction that depends on the size of the detected white dots, the white dots become black dots when overcorrection is performed. Because black dots are very noticeable at high brightness, this needs to be avoided. On the one hand, since the detection period of the noise level X is shorter than the period until the start of AD conversion of the optical signal S2 that generates the captured image to be corrected, undercorrection occurs when a coefficient of 1 or more is not applied. On the other hand, in the case where undercorrection occurs and white dots remains, these white dots are noticeable at intermediate/low brightness. In order to strike a balance between these solutions, settings need only be configured such that the third coefficient which is applied to high brightness approximates 1 while setting the first coefficient and the second coefficient which are applied to intermediate/low brightness to values approximating equation (1) or equation (2).

Thus, by replacing the detected noise level X with a value obtained by multiplying the detected noise level X by a coefficient that differs according to the brightness value, noise correction appropriate for the brightness value becomes possible.

Note that processing that is based on the flowchart described in the second or third embodiment may be performed with a signal processing chip that is integrated with the image sensor through stacking. Also, control may be performed in combination with the processing of the second embodiment, using the configuration shown in FIG. 3B.

Fourth Embodiment

Next, a fourth embodiment of the present invention will be described. In the fourth embodiment, an image sensor with which effects equivalent to the first embodiment are obtained with a very simple configuration is shown.

Figure 6:
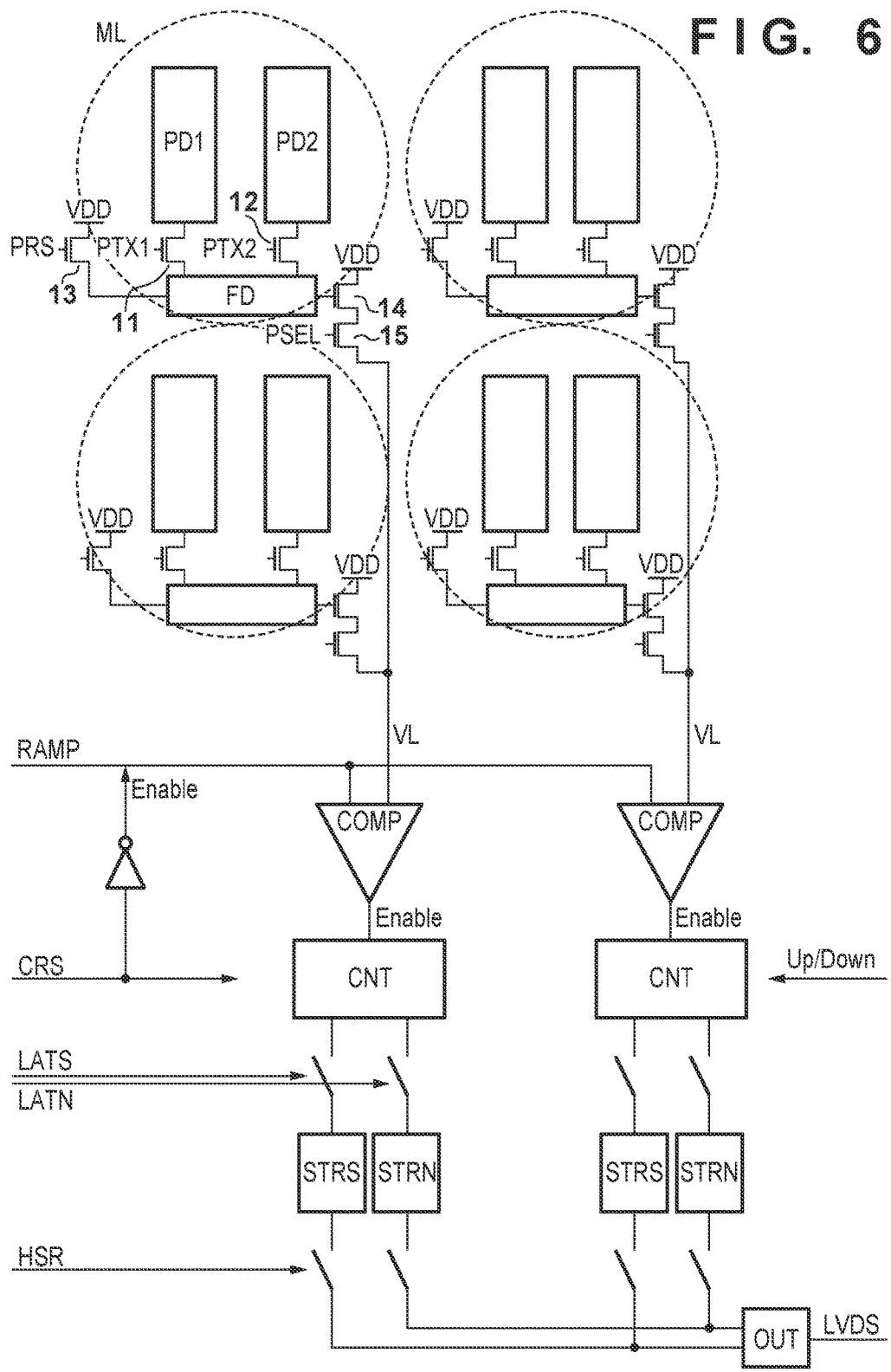
FIG. 6 is a block diagram representing the configuration of an image sensor according to a fourth embodiment.
Figure 7:
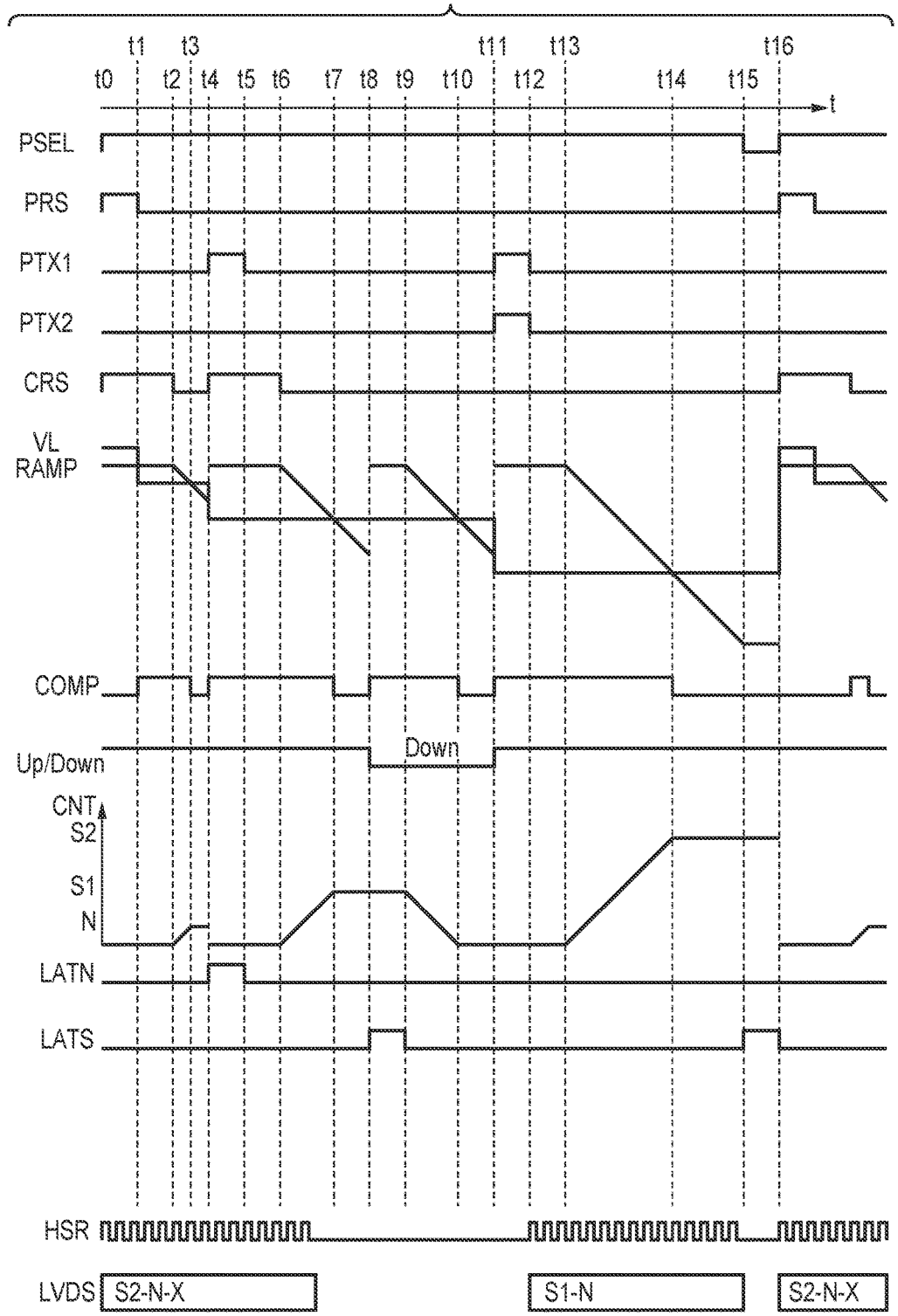
FIG. 7 is a timing chart showing a drive method for the image sensor according to the fourth embodiment.

FIG. 6 is a block diagram representing a configuration of the image sensor in the fourth embodiment, and FIG. 7 is a timing chart representing a drive method for the image sensor in the fourth embodiment.

The image sensor shown in FIG. 6 differs from the image sensor shown in FIG. 1 in that the latch circuit STRX for temporary storage of the detected noise level X is omitted, and in that the latch transfer control line LATX is also consequently omitted.

Also, the timing chart shown in FIG. 7 differs from the timing chart shown in FIG. 2 in that, in addition to omitting the latch transfer control line LATX, the high period of the counter reset control line CRS from time t11 until time t13 is entirely fixed at low. The latter is so that resetting of the counter CNT that was performed before the start of AD conversion of the optical signal S2 is not performed.

Accordingly, AD conversion of the optical signal S2 is started in a state where the count value X obtained at t9 when AD conversion of the noise level X ended remains stored. That is, because the counting of S2 is performed with X as the initial value, S2-X is temporarily stored in the latch circuit STRS from times t15 until t16. Outputting the difference signal with the reset level N in the period in which the horizontal scanning signal HSR is generated enables a captured image S2-N-X that has undergone noise correction to be obtained.

According to the fourth embodiment, effects substantially equivalent to the abovementioned first embodiment can be obtained simply by refining the drive method, and the image sensor can be easily constituted without needing to expand the latch circuitry.

Fifth Embodiment

Next, a fifth embodiment of the present invention will be described. In the abovementioned first to fourth embodiments, the case where a phase difference detection signal and a captured image are output in all of the rows was described. On the other hand, driving in a state in which rows (first rows) that output both a phase difference detection signal and a captured image exist together with rows (second rows) that output only a captured image has been proposed conventionally. As an example, a drive method for an image sensor in which first rows are densely allocated according to the selected autofocus region and second rows are allocated to the remaining region is conceivable. A balance can thereby be struck between the high speed of the rows that output only a captured image and phase difference detection. With this technology, although reducing the noise difference between the first rows and the second rows becomes an issue by properly performing noise correction of the first rows, the present invention is able to favorably use this technology in a drive method for such an image sensor.

Figure 8:
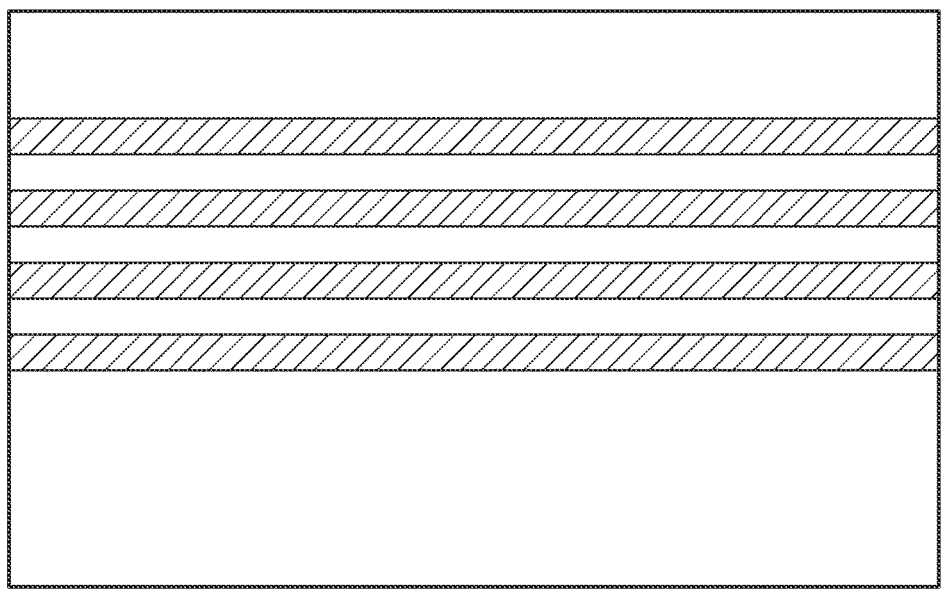
FIG. 8 is a diagram showing an example of regions of an image sensor from which readout in a first readout mode and a second readout mode is performed according to a fifth embodiment.

In the fifth embodiment, the mode for when reading out the first rows that output both a phase difference detection signal and a captured image is called a first readout mode, and the mode for when reading out rows that only output a captured image is called a second readout mode. FIG. 8 is a diagram showing an example of regions of an image sensor from which readout in the first readout mode and the second readout mode is performed. Hereinafter, the drive method in the fifth embodiment will be described.

Figure 9:
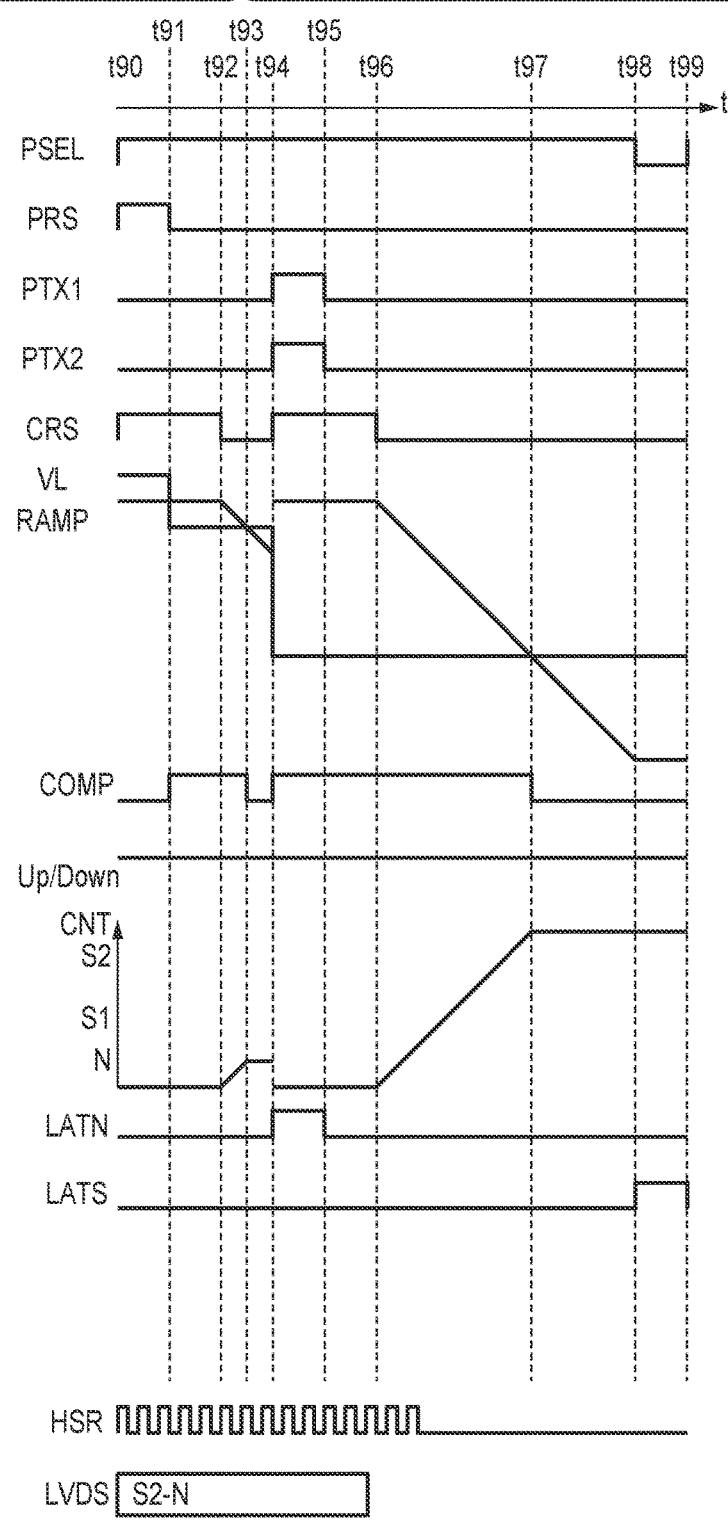
FIG. 9 is a timing chart showing a drive method for the image sensor in the second readout mode according to the fifth embodiment.

FIG. 9 is an example of a timing chart representing a second readout mode in which the period from times t90 until t99 is one horizontal synchronization period. The period from time t90 until time t98 is the selection period for rows in which the selection signal PSEL is high. Since the operation for AD conversion of the FD reset level that is performed from time t90 until time t94 is similar to the operation that is performed from time t0 until time t4 of FIG. 2, description is omitted.

In the period from time t94 until time t95, the control signals PTX1 and PTX2 of the transfer transistors 11 and 12 are set to high simultaneously to transfer the signal charges of the PD 1 and the PD 2 to the FD. At time t96, the polarity of the counter reset control line CRS is changed to low, and AD conversion of the optical signal S2 is started. The relation RAMP signal ≤ VL is established at time t97, and the count value S2 at this time is transferred to the latch circuit STRS, in accordance with the latch transfer control signal LATS that is high from time t98 until time t99. The horizontal scanning signal HSR is generated from time t99, and the difference signal of the optical signal S2 and the reset level N is output in LVDS format. Note that the horizontal scanning signal HSR and the LVDS output S2-N that are generated from time t90 to the vicinity of time t96 are signals of the previous row.

As described above, because transfer and AD conversion of the optical signal S1 for phase difference detection are not necessary in the second readout mode, the length of one horizontal synchronization period is shortened. Also, the time period from FD reset release to AD conversion of the optical signal S2 is thus also shortened, resulting in a situation in which few white dots are caused by the FD on average. That is, S/N is high for a captured image.

Figure 10:
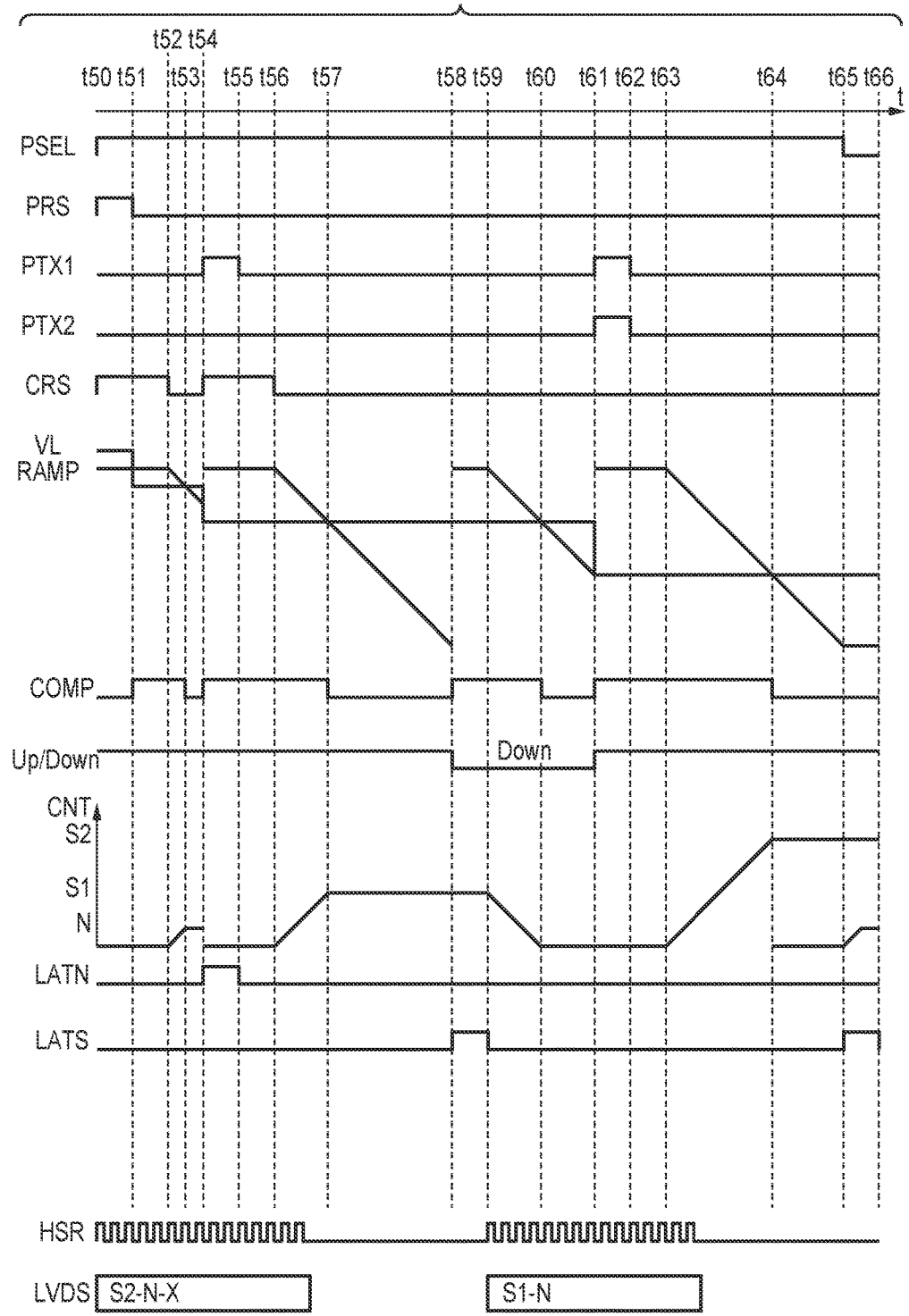
FIG. 10 is a timing chart showing a drive method for the image sensor in the first readout mode according to the fifth embodiment.

Next, the first readout mode in the fifth embodiment will be described. FIG. 10 is an example of a timing chart representing a first readout mode in which the period from time t50 until time t66 is two horizontal synchronization periods. Of these two horizontal synchronization periods, the period until time t59 is equal to the length of one horizontal synchronization period in the second readout mode. Also, the period from time t59 until the transfer signals PTX1 and PTX2 rise at time t61 and the period from time t50 until the transfer signal PTX1 rises at time t54 are configured to be equal. Driving in a state in which the first readout mode and the second readout mode are realized together in a simple circuit configuration thereby becomes possible.

Thus, the readout time period of one row becomes longer than the timing charts used in the descriptions of the first to fourth embodiments. Although issues regarding the white dots caused by the FD which are substantially proportional to time increase, a period for such noise level detection can be adequately provided.

Since the point at which the polarity of the drive signal is changed from time t50 until time t66 is similar to that shown in FIG. 7, detailed description is omitted. The detection period of the noise level X in the second readout mode in the case where such settings are configured is, however, desirably provided as close as possible to the AD conversion period of the optical signal S2 and before signal charge transfer from the PD 2. Even if the time period from reset release of the FD until the start of AD conversion of the optical signal S2 is lengthened, detection of the noise level X can be correctly performed, and the difference that occurs due to the time period until detection differing from the time period until the start of AD conversion of the optical signal S2 can be reduced.

On the basis of this idea, even if a configuration for performing processing, replacement and the like of the noise level X described in the second embodiment and the like is not provided, noise correction on a captured image can be performed with the configuration of a simple image sensor such as shown in FIG. 6. Note that even in this case, because the object is to perform noise correction to the extent of the captured image in the second readout mode, when performing processing and replacement of the noise level X using coefficients such as in the third embodiment, coefficients based on equation (2) are desirably set.

Note that although, in the abovementioned embodiments, description was given taking an image sensor provided with PDs that divide the pupil of the imaging optical system into two and receive light, the present invention can be similarly applied to an image sensor provided with N number of PDs that divide the pupil of the imaging optical system into N, where N is an integer of 3 or more.

The present invention can also be applied to an image sensor having a configuration in which one FD is shared by a plurality of pixels that each has one photoelectric conversion element. In that case, control is performed to transfer the electric charges of some of the plurality of pixels, and thereafter transfer the electric charges of at least some pixels including the remaining pixels to the FD and perform AD conversion.

Also, the abovementioned image sensor is capable of being used by being mounted in a suitable electronic device that is provided with a camera function, such as not only an image capturing apparatus such as a digital still camera and a digital camera but also a mobile phone with a camera function or a computer with a camera, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-054462, filed on Mar. 17, 2016 which is hereby incorporated by reference herein in its entirety.

What is claimed is:

1. An image sensor comprising:
a pixel portion in which a plurality of unit pixels each provided with a plurality of photoelectric conversion portions and a floating diffusion portion shared by the plurality of photoelectric conversion portions are arrayed in matrix form;
an analog-digital converter that compares an analog signal with a reference signal that changes over time at a predetermined gradient, and converts the analog signal to a digital signal by counting, in a first direction or a second direction that differs from the first direction, from a start of the comparison until a transition point of a result of the comparison; and
a control circuit that controls the analog-digital converter;
wherein the control circuit controls the analog-digital converter in a first mode to:
convert a reset level of the floating diffusion portion by counting in the first direction or the second direction to acquire a first noise signal,
acquire a first optical signal by counting, in the first direction, an analog signal obtained by transferring a first photo charge accumulated in one or more photoelectric conversion portions including at least a first photoelectric conversion portion, among the plurality of photoelectric conversion portions, to the floating diffusion portion,
acquire a second noise signal by counting, in the second direction, a potential that the floating diffusion portion has after the first optical signal is acquired,
acquire a second optical signal by counting, the first direction, an analog signal obtained by transferring a second photo charge accumulated in at least a second photoelectric conversion portion not included in the one or more photoelectric conversion portions, among the plurality of photoelectric conversion portions, to the floating diffusion portion.

2. The image sensor according to claim 1, further comprising:
a storage that stores the digital signal obtained by the analog-digital converter; and
a processor that selectively performs first processing for replacing the second noise signal stored in the storage with a predetermined value in a case where the second noise signal is smaller than a predetermined threshold and second processing for replacing the second noise signal stored in the storage with a value obtained by multiplying the second noise signal stored in the storage by a predetermined coefficient.

3. The age sensor according to claim 2, wherein the predetermined value is 0.

4. The image sensor according to claim 2, wherein coefficient is a ratio of a time period taken to acquire the second noise signal and one of a time period from after conversion to the first noise signal until conversion of the second optical signal is started and a time period from after conversion to the first noise signal until the second photo charge accumulated in the second photoelectric conversion portion is transferred to the floating diffusion portion.

5. The image sensor according to claim 1, further comprising:
a storage that stores the digital signal obtained by the analog-digital converter; and
a processor that performs processing for replacing the second noise signal stored in the storage with a value obtained by multiplying the second not e signal stored in the storage by a coefficient set according to a magnitude of the first optical signal.

6. The image sensor according to claim 1, further comprising:
an output circuit that outputs the digital signal obtained by the analog-digital converter,
wherein the output circuit, outputs a signal obtained by subtracting the first noise signal from the first optical signal, and a signal obtained by subtracting the first noise signal and the second noise signal from the second optical signal.

7. The image sensor according to claim 1, further comprising:
an output circuit that outputs the digital signal obtained by the analog-digital converter,
wherein the control circuit performs control to acquire the second optical signal by counting in the first direction, with a count of the second noise signal obtained by counting in the second direction as an initial value, and
the output circuit outputs a signal obtained by subtracting the first noise signal from the first optical signal, and a signal obtained by subtracting the first e signal from the second optical signal.

8. The image sensor according to claim 1, further comprising:
a plurality of microlenses,
wherein the plurality of photoelectric conversion portions each correspond a different one of the plurality of microlenses.

9. The image sensor according to claim 1,
wherein the control circuit further controls the analog-digital converter a second mode to:
convert the reset level of the floating diffusion portion by counting in the first direction to acquire the first noise signal, and
convert an analog signal obtained by transferring electric charges accumulated in the plurality of photoelectric conversion portions to the floating diffusion portion by counting in the first direction to acquire a third signal, and the control circuit controls readout of a predetermined region of the photoelectric conversion portions arrayed in matrix form in, the first mode, and controls readout of a region other than the predetermined region in the second mode.

10. The image sensor according to claim 9,
wherein a readout cycle of the photoelectric conversion portions for one rode in the first mode is twice as long as a readout cycle of the photoelectric conversion portions for one row in the second mode.

11. An image capturing apparatus in which an image sensor s mounted, wherein the image sensor comprising:
a pixel portion in which a plurality of unit pixels each provided with a plurality of photoelectric conversion portions and a floating diffusion portion shared by the plurality of photoelectric conversion portions are arrayed in matrix form;
an analog-digital converter that compares an analog signal with a reference signal that changes over time at a predetermined gradient, and converts the analog signal to a digital signal by counting, in a first direction or a second direction that differs from the first direction, from a start of the comparison until a transition point of a result of the comparison; and
a control circuit that controls the analog-digital converters;
wherein the control circuit controls the analog-digital converter in a first mode to:
convert a reset level of the floating diffusion portion by counting in the first direction or the second direction to acquire a first noise signal,
acquire a first optical signal by counting, in the first direction, an analog signal obtained by transferring a first photo charge accumulated in one or more photoelectric conversion portions including at least a first photoelectric conversion portion, among the plurality of photoelectric conversion portions, to the floating diffusion portion,
acquire a second noise signal by counting, in the second direction, a potential that the floating diffusion portion has after the first optical signal is acquired, and
acquire a second optical signal by counting, in the first direction, an analog signal obtained by transferring a second photo charge accumulated in at least a second photoelectric conversion portion not included in the one or more photoelectric conversion portions, among the plurality of photoelectric conversion portions, to the floating diffusion portion.

12. An image sensor comprising:
a pixel portion in which a plurality of unit pixels ach provided with a plurality of photoelectric conversion portions and a floating diffusion portion shared by the plurality of photoelectric conversion portions are arrayed in matrix form; and
a control circuit that controls the pixel portion;
wherein the control circuit performs control to:
reset the floating diffusion portion, and acquire a first noise signal based on a potential that the floating diffusion portion has after the resetting,
transfer a first photo charge accumulated in one ore photoelectric conversion portions including at least a first photoelectric conversion portion, among the plurality of photoelectric conversion portions, to the floating diffusion portion, and acquire a first optical signal based on the potential of the floating diffusion portion to which the first photo charge was transferred,
acquire a second noise signal by taking a difference between a signal based on the potential that the floating diffusion portion has after the first optical signal is acquired and the first optical signal, and
transfer a second photo charge accumulated in at least a second photoelectric conversion portion not included in the one or more photoelectric conversion portions, among the plurality of photoelectric conversion portions, to the floating diffusion portion, and acquire a second optical signal based on the potential of the floating diffusion portion to which the second photo charge was transferred.

13. A control method of an image sensor having a pixel portion in which a plurality of unit pixels each provided with a plurality of photoelectric conversion portions and a floating diffusion portion shared by the plurality of photoelectric conversion portions are arrayed in matrix form, and an analog-digital converter that compares an analog signal with a reference signal that changes over time at a predetermined gradient, and converts the analog signal to a digital signal by counting, in a first direction or a second direction that differs from the first direction, from a start of the comparison until a transition point of a result of the comparison, the analog-digital converter:
converting a reset level of the floating diffusion portion by counting in the first direction or the second direction to acquire a first noise signal,
acquiring a first optical signal by counting, in the first direction, an analog signal obtained by transferring a first photo charge accumulated in one or more photoelectric conversion portions including at least a first photoelectric conversion portion, among the plurality of photoelectric conversion portions, to the floating diffusion portion,
acquiring a second noise signal by counting, in the second direction, a potential that the floating diffusion portion has after the first optical signal is acquired, and
acquiring a second optical signal by counting, in the first direction, an analog signal obtained by transferring a second photo charge accumulated in at least a second photoelectric conversion portion not included in the one or ore photoelectric conversion portions, among the plurality of photoelectric conversion portions, to the floating diffusion portion.

14. A control method of an image sensor having a pixel portion in which a plurality of unit pixels each provided with a plurality of photoelectric conversion portions and a floating diffusion portion shared by the plurality of photoelectric conversion portions are arrayed in matrix form, the method comprising:
resetting the floating diffusion portion, and acquiring a first noise signal based on a potential that the floating diffusion portion has after the resetting,
transferring a first photo charge accumulated in one or more photoelectric conversion portions including at least a first photoelectric conversion portion, among the plurality of photoelectric conversion portions, to the floating diffusion portion, and acquiring a first optical signal based on the potential of the floating diffusion portion to which the first photo charge was transferred,
acquiring a second noise signal by taking a difference between a signal based on the potential that the floating diffusion portion has after the first optical signal is acquired and the first optical signal, and
transferring a second photo charge accumulated in at least a second photoelectric conversion portion not included in the one or more photoelectric conversion portions, among the plurality of photoelectric conversion portions, to the floating diffusion portion, and acquiring a second optical signal based on the potential of the floating diffusion portion to which the second photo charge was transferred.

* * * * *